US011840585B2

(12) United States Patent
Pahimanolis (10) Patent No.: US 11,840,585 B2
(45) Date of Patent: Dec. 12, 2023

(54) CELLULOSE DERIVATIVES (71) Applicant: Betulium Oy, Espoo (FI)

(72) Inventor: Nikolaos Pahimanolis, Espoo (FI)

(73) Assignee: Betulium Oy, Espoo (FI)

(*) Notice: Subject to any disclaimer, the term of this patent is extended or adjusted under 35 U.S.C. 154(b) by 483 days.

(21) Appl. No.: 16/610,806

(22) PCT Filed: May 4, 2018

(86) PCT No.: PCT/FI2018/050328
§ 371 (c)(1),
(2) Date: Nov. 4, 2019

(87) PCT Pub. No.: WO2018/202955
PCT Pub. Date: Nov. 8, 2018

(65) Prior Publication Data
US 2021/0155716 A1  May 27, 2021

(30) Foreign Application Priority Data
May 5, 2017  (FI) ..................................... 20175394

(51) Int. Cl.
C08B 5/14       (2006.01)
C08B 1/02       (2006.01)
C08B 11/00      (2006.01)
C08B 1/06       (2006.01)
B82Y 40/00      (2011.01)

(52) U.S. Cl.
CPC ............... C08B 5/14 (2013.01); C08B 1/02 (2013.01); C08B 1/06 (2013.01); C08B 11/00 (2013.01); B82Y 40/00 (2013.01)

(58) Field of Classification Search
CPC ....................................................... C08B 5/14
See application file for complete search history.

(56) References Cited

U.S. PATENT DOCUMENTS

| | | | |
|---|---|---|---|
| 2,194,956 A * | 3/1940 | Taylor | D21C 9/14 162/88 |
| 2,511,229 A * | 6/1950 | Cunningham | C08B 5/14 536/33 |
| 3,077,373 A | 2/1963 | Kerr | |
| 3,528,963 A | 9/1970 | Reid | |
| 3,563,241 A * | 2/1971 | Evans | A61L 15/28 604/394 |
| 4,064,342 A | 12/1977 | Saika et al. | |
| 4,664,717 A | 5/1987 | Young | |
| 4,940,785 A | 7/1990 | Stober et al. | |
| 5,252,117 A | 10/1993 | Young | |
| 5,522,967 A | 6/1996 | Shet | |
| 5,731,259 A | 3/1998 | Palumbo et al. | |
| 6,174,358 B1 * | 1/2001 | Oberkofler | C08L 1/06 106/167.01 |
| 6,602,994 B1 | 8/2003 | Cash et al. | |
| 6,849,156 B2 * | 2/2005 | Besemer | D21H 11/22 162/146 |
| 8,710,213 B2 | 4/2014 | Zhu et al. | |
| 9,040,681 B2 | 5/2015 | Kimura et al. | |
| 2006/0016568 A1 * | 1/2006 | Gillette | D21C 5/00 162/95 |
| 2009/0111980 A1 | 4/2009 | Hafren et al. | |
| 2010/0274001 A1 | 10/2010 | Okutsu et al. | |
| 2012/0043039 A1 * | 2/2012 | Paltakari | D21H 11/18 428/401 |
| 2013/0005957 A1 | 1/2013 | Kimura et al. | |
| 2015/0094464 A1 | 4/2015 | Saxell et al. | |

FOREIGN PATENT DOCUMENTS

| | | |
|---|---|---|
| CA | 2874414 A1 | 1/2014 |
| CN | 1335856 A | 2/2002 |
| CN | 101168602 A | 4/2008 |
| CN | 102947344 A | 2/2013 |
| CN | 103936930 A | 7/2014 |
| CN | 105111318 A | 12/2015 |
| CN | 105189857 A | 12/2015 |
| EP | 0859011 A1 | 8/1998 |
| EP | 0869011 A1 | 10/1998 |
| EP | 2428610 A1 | 3/2012 |

(Continued)

OTHER PUBLICATIONS

Li, G., Fu, Y., Shao, Z., Zhang, F., and Qin, M. (2015). "Preparing cationic cellulose derivative in NaOH/urea aqueous solution and its performance as filler modifier," BioRes. 10(4), 7782-7794 (Year: 2015).*
Rashidi Jouybari, I., Yoosefi, M., and Azadfallah, M., Preparation of cationic CMP and softwood long fibers as strength-enhancing additive to CMP pulp, BioRes. 12(2), 2017, 3890-3904 (Year: 2017).*
Abbott, Cationic functionalization of cellulose using choline based ionic liquid analogue, Green Chem., 2006, 8, p. 84-786 (Year: 2006).*
Abbott, A. P., et al., "Cationic functionalisation of cellulose using a choline based ionic liquid analogue", Green Chem., 8, 2006, 784-786.
Abbott, A. P. et al., "Cationic functionalisation of cellulose using a choline based ionic liquid analogue" Supplementary Material (ESI) for Green Chemistry, 2006.
Cai, J., et al., "Dynamic Self-Assembly Induced Rapid Dissolution of Cellulose at Low Temperatures", Macromolecules, 41, 2008, 9345-9351.

(Continued)

Primary Examiner — Tabatha L Penny
(74) Attorney, Agent, or Firm — ELMORE PATENT LAW GROUP, P.C.; Joseph C. Zucchero; Carolyn S. Elmore (57) ABSTRACT The present invention provides a method for derivatizing cellulose pulp at high solids content or even at a fully dry state without pretreating the cellulose, the method comprising preparing a reaction medium comprising urea and at least one derivatization reagent; carrying out a chemical derivatization reaction between the at least one derivatization reagent and the cellulose pulp in a reaction system comprising the cellulose pulp in contact with the reaction medium; and optionally purifying and/or recovering the derivatized cellulose product. The present description also relates to products obtainable using said method.

19 Claims, 4 Drawing Sheets

(56) References Cited

FOREIGN PATENT DOCUMENTS

| | | |
|---|---|---|
| JP | 2012021119 A | 2/2012 |
| JP | 2016199770 A | 12/2016 |
| WO | 2009123148 A1 | 10/2009 |
| WO | 2014041251 A1 | 3/2014 |

OTHER PUBLICATIONS

Dupont, A-L., "Cellulose in lithium chloride/N,N-dimethylacetamide, optimisation of a dissolution method using paper substrates and stability of the solutions", Polymer, 44, 2003, 4117-4126.

Isobe, N., et al., "Role of urea in alkaline dissolution of cellulose", Cellulose, 20, 2013, 97-103.

Kokol, V., et al., "Characterisation and properties of homo- and heterogenously phosphorylated nanocellulose", Carbohydrate Polymers, 125, 2015, 301-313.

Li, M-F., et al., "Cold NaOH/urea aqueous dissolved celluose for benzylation", European Polymer J, 47, 2011, 1817-1826.

Liimatainen, H., et al., "Sulfonated cellulose nanofibrils obtained from wood pulp through regioselective oxidative bisulfite pre-treatment", Cellulose, 20, 2013, 741-749.

Nagel, M. C.V., et al., "Homogenous methylation of wood pulp cellulose dissolved in LiOH/urea/H2O", European Polymer J., 46, 2010, 1726-1735.

Selkälä, T., et al., "Anionically Stabilized Cellulose Nanofibrils through Succinylation Pretreatment in Urea-Lithium Chloride Deep Eutectic Solvent", ChemSusChem., 9, 2016, 3074-3083.

Sirviö, J. A., et al., "Acidic Deep Eutectic Solvents as Hydrolytic Media for Cellulose Nanocrystal Production", Biomacromolecules, 17, 2016, 3025-3032.

Sirviö, J. A., et al., "Deep eutectic solvent system based on choline chloride-urea as a pre-treatment for nanofibrillation of wood cellulose", Green Chem., 17, 2015.

Sirviö, J. A., et al., "Synthesis of Alkaline-Soluble Cellulose Methyl Carbamate Using a Reactive Deep Eutectic Solvent", GreenSusChem, 10, 2017, 455-460.

Song, Y. et al., "Homogenous modification of cellulose with acrylamide in NaOH/urea aqueous solutions", Carbohydrate Polymers, 73, 2008, 18-25.

Steinmeier, H., "Acetate Manufacturing, Process and Technology", Macromol. Symp., 208, 2004, 49-60.

Xiong, R., et al., "Investigations on Solution of Cellulose in Complex Phosphoric Acid Solvent and Its Stability", Cellulose Chem. Technol., 47(3-4), 2013, 153-163.

Zhang, J., et al., "Oxidation and sulfonation of cellulosics", Cellulose, 15, 2008, 489-496.

Zhang, S., et al., "Swelling and Dissolution of Cellulose In NaOH Aqueous Solvent Systems", Cellulose Chem Technol., 47 (9-10), 2013, 671-679.

English translation of Office Action dated Jul. 1, 2021 in CN 201880029210X.

Search Report dated Jul. 1, 2021 issued in CN 201880029210X.

Machine Translation, JP2016199770A.

Office Action with machine translation for Japanese application No. 2020-512090, dated Apr. 8, 2022.

Translated Office Action dated Jan. 4, 2023 in JP2020-512090.

\* cited by examiner

CELLULOSE DERIVATIVES

The present invention relates to methods for producing derivatized cellulose, and to derivatized cellulose products obtained using said methods.

BACKGROUND

Chemically derivatized cellulose and derivatized cellulose nanofibers are used in a wide range of applications, for example in materials science, water purification, absorbent, catalyst carrier, ion-exchange material, fertilizer, controlled release material, as a food and/or feed binder, viscosity modifier or food supplement to name a few. Typically, chemical derivatization of cellulose requires thermal, mechanical or chemical pre-treatment to mercerize or reduce the crystallinity and to allow derivatization to proceed within cellulose fiber or the use of large reagent excess and/or organic solvents to facilitate reaction. The following patents represent the current state of the art.

US20100274001, US20130005957 and U.S. Pat. No. 9,040,681 describe the etherification of pre-processed cellulose at solventless conditions. In these methods the crystallinity of the cellulose was reduced by mechanical grinding process. Patent U.S. Pat. No. 4,940,785 describes a semi-dry method for cationization of powdered, low crystallinity cellulose, however no higher DS values than 0.158 and solubility/dispersibility data were reported. Recently, a patent CN103936930 describes cationization of parenchymal cellulose obtained from pre-treated bagasse pith using water as reaction media in the presence of a high reagent feed. U.S. Pat. No. 5,731,259 describes the etherification of cellulose with epoxy compounds using large excess of reagents and catalysts.

EP0859011 describes a method to produce cationic microfibrillated cellulose, however, the process uses high excess of reagents in water or organic solvent medium. Several similar cationization systems have been studied for cellulose nanocrystals of microfibrils (Carbohydr. Polym. 2016 135 239-247; Carbohydr. Polym. 2012 89 1 163-170; Soft Matter 2008 4 2238-2244; Soft Matter 2013 9 2047-2055; Carbohydr Polym 2015, 131, 224-232). The cationization of cellulose nanocrystals is described in EP2428610 using water as reaction medium which results in high amount of reagent loss due to hydrolysis. EP0869011 describes the use of isopropanol or other hindered alcohol as reaction media for cationization of alkali-pretreated cellulose.

Carboxymethylation of microfibrillar celluloses has been described in U.S. Pat. No. 6,602,994 using organic solvents or semi-dry alkali pretreatment. In addition, patent US20150094464 describes the etherification of cellulose using alkali-treated never-dried cellulose, without additional water.

Cellulose sulfate esters can be obtained using sulfuric acid, sulfur trioxide, sulfuryl chloride, chlorosulfonic acid and the like with or without combination of amines/amides (U.S. Pat. Nos. 4,064,342; 3,528,963; 3,077,373). U.S. Pat. No. 2,511,229 describes a process of heat treatment of sulfamic acid combined with an amide of carboxylic acid (urea). Sulfated cellulose nanocrystals are produced using 65% sulfuric acid hydrolysis treatment and a combined nanofibrillated cellulose/cellulose nanocrystal production method has been described U.S. Pat. No. 8,710,213. Recently, derivatized cellulose nanocrystals were obtained employing a slurry of choline chloride based deep eutectic solvent system with various acids (Biomacromol 2016, 17, 3025-3032). In addition, sulfated cellulose fibers (U.S. Pat. No. 5,522,967), nanocellulose and cellulose nanocrystals were produced from oxidized cellulose (Cellulose 2008 15 489-496; Cellulose 2013 20 (2) 741-749). Sulfuric acid/urea mixture has been used to weaken cellulose fibers and to produce oligomers and sugars (U.S. Pat. Nos. 5,252,117; 4,664,717). Organic acid esters of cellulose are known for a long time and have been well established. The industrial scale acetylation is predominantly done in acetic acid process, that is, acetic acid as a solvent, using dissolving wood pulp, an excess of acetic anhydride as acetylating reagent and sulfuric acid or perchloric acid as the catalyst (Macromolecular Symposia, 208 (2004) 49-60). US20090111980 describes an organocatalytic process for esterification using various active esters.

Ionic liquids, phosphoric acid, amine/DMSO, NMMO/H2O, Copper ethylene diamine (Cellulose Chem. Technol. 2013 47 (3-4) 153-163; Cellulose Chem Technol 2014 47 (9-10) 671-679) and their utilization for nanofibrillation has been described (CA2874414) as native cellulose solvents and nanofibrillation aids. Aqueous solutions of urea with combination with alkali and LiCl/dimethylacetamide have been shown to swell and dissolve cellulose (Macromol 2008 41 9345-9351; Cellulose 2013 20 (1) 97-103; Polymer 2003 44 4117-4126). In addition, choline chloride-urea deep eutectic solvent system has been proposed as a swelling pretreatment for nanofibrillation of cellulose (Green Chem 2015 17 3401). Recently dry urea/LiCl deep eutectic solvent system has been used as a swelling derivatizing reaction media for succinylation of dissolving pulp (GreenSusChem 2016 9 3074-3083). Cellulose carbamates have been obtained using dimethyl urea/ZnCl2 solvent system, however a 10 fold excess of reagents were employed (GreenSusChem 2017 10 455-460).

However, prior art derivatisation methods often lead into formation of gel-structures in water which makes the purification of reaction products difficult. This is particularly typical problem when nanofibrillated cellulose is derivatised.

There is currently no generic dry, semi dry, or high solids method for derivatizing cellulose using reagents capable of swelling and penetrating cellulose fibers to fibril level to facilitate derivatization.

SUMMARY

The present invention provides a method for derivatizing cellulose pulp at high solids content or even at a fully dry state without pretreating the cellulose. The method increases reaction efficiency and makes further process operations easier. Benign reaction conditions and a reduced use of catalysts/reagents can be achieved, reducing the costs of reagents and purification procedures. In certain embodiments the invention makes use of reagents that are capable of simultaneously penetrating/activating the cellulose fiber and to act as a reagent/catalyst for derivatization reactions.

According to a first aspect is provided a method for derivatizing cellulose comprising:
  a. Preparing a reaction medium comprising urea and at least one derivatisation reagent.
  b. Carrying out a chemical derivatisation reaction between the at least one derivatization reagent and the cellulose pulp in a reaction system comprising the cellulose pulp in contact with the reaction medium; and
  c. Optionally purifying and/or recovering the derivatized cellulose product.

According to a second aspect is provided a derivatized cellulose product obtainable by the method according to the first aspect and having a Brookfield viscosity of at least 10 cP, preferably at least 100 cP measured at concentration of 1.0 weight-% at 100 rpm shear rate and/or a turbidity value less than 1000 NTU, preferably in the range of 0.1-700 NTU, measured at 0.1 weight-% concentration.

According to third aspect is provided a derivatized cellulose product obtained by the method according to the first aspect, wherein the degree of derivatisation is 0.05-2.5 mmol/g, preferably 0.1-1.5 mmol/g, most preferably 0.5-1.3 mmol/g.

According to the fourth aspect is provided a derivatized cellulose product obtained by the method according to the first aspect, wherein the product is not soluble in water at pH 2-13 at temperatures between 0-120° C., measured at 1 weight-% concentration.

According to a fifth aspect is provided a composition comprising the derivatized cellulose product of the third aspect.

According to a sixth aspect is provided a complexing agent comprising the derivatized cellulose product of the third aspect. In an embodiment the complexing agent is for complexing silver or silver salts.

According to a seventh aspect is provided refined derivatized cellulose product obtainable by refining the derivatized cellulose product of the second or the third aspect.

In an embodiment the above aspects of the invention are carried out at industrial scale.

DETAILED DESCRIPTION

Suitable "cellulose pulp" utilized in as a raw material may be obtained from any cellulose raw material based on any plant material that contains cellulose, any microbial cellulose, or any cellulose raw material source that can be used in production of cellulose pulp.

Plant material may be any wood derived or non-wood derived plant material. Said wood may be selected from softwood (SW) trees, such as spruce, pine, fir, larch, douglas-fir and hemlock, from hardwood (HW) trees, such as birch, aspen, poplar, alder, eucalyptus and acacia, and from mixtures of softwoods and hardwoods. Said non-wood plant material may be selected from agricultural residues, grasses and other plant materials, such as straw, leaves, bark, seeds, hulls, flowers, vegetables and fruits, from cotton, corn, wheat, oat, rye, barley, rice, flax, hemp, manilla hemp, sisal hemp, jute, ramie, kenaf, bagasse, bamboo and reed.

The cellulose containing raw material may also be derived from cellulose producing micro-organisms, such as materials obtained from bacterial fermentation processes. The micro-organisms may be selected from the genus *Acetobacter*, *Agrobacterium*, *Rhizobium*, *Pseudomonas* and *Alcaligenes*, suitably the genus *Acetobacter* and particularly suitably the species *Acetobacter xylinum* or *Acetobacter pasteurianus*. Cellulose may also be obtained from algae, for example cellulose can be found in structural walls of green algae, brown algae, most of the red algae and most of the golden algae.

The term "cellulose pulp" also refers to cellulose fibers, which are isolated from any cellulose containing raw material using chemical, mechanical, thermo-mechanical, or chemi-thermo-mechanical pulping processes. Particularly cellulose pulp, which can be pulp of plant origin, especially wood (dissolving pulp, SW or HW pulp).

The term "cellulose nanofiber" or "microfibrillated cellulose" refers to isolated cellulose fibers and fiber bundles having a diameter in the submicron range. The length of the cellulose nanofiber may exceed 200 nm while the number-average fiber diameter is typically below 50 nm. The smallest cellulose nanofibers are similar to so called elementary fibrils, which are typically 2-12 nm in diameter. Microfibrillated cellulose is typically a branched, often aggregated, assembly of cellulose nanofibers with diameters typically between 7 to 200 nm and length several micrometers. The products may be obtained by mechanical disintegration of derivatized cellulose pulp with suitable equipment, such as a refiner, grinder, homogenizer, colloider, friction grinder, ultrasound-sonicator, fluidizer such as microfluidizer, macrofluidizer or fluidizer-type homogenizer. The grades have different properties depending on the manufacturing method, degree of fibrillation and chemical composition. The chemical compositions of the grades also vary. Depending on the raw material source, e.g. HW vs. SW pulp, different polysaccharide composition exists in the final NFC product. Typically, grades with low degree of derivatization have larger diameters and wider fibril size distribution while the highly derivatized grades have smaller diameters and narrower size distributions.

The "derivatised cellulose product" refers to a cellulose pulp which has been chemically modified to carry covalently attached additional functionality. The derivatisation may be based e.g. on etherification or esterification, especially suitable derivatisations are sulfation and cationisation.

Sulfation is defined as any process of introducing an $SO_3$ group into organic compounds to obtain sulfate ester $C$—$OSO_3$ configuration, where the oxygen is attached to the carbon backbone. In case of sulfation of alcohol-groups, chlorosulfonic acid, sulfur trioxide, sulfuric acid or sulfamic acid are typically employed as reagents. [Kirk-Othmer Encyclopedia of Chemical Technology 4th edition, 2004, Vol 23 pp 83]

The derivatization can be heterogeneous and predominantly targeted on surfaces of cellulose elementary fibrils. This kind of heterogeneous derivatization typically leads to a product that is not soluble in water, even at high pH range, i.e. individual cellulose macromolecules cannot be separated from the product. At high degree of derivatization even complete dissolution of derivatized cellulose molecules may take place. In an embodiment a further derivatization reaction, or a chemical modification reaction, is carried out to provide a derivatized cellulose product, which is soluble or partially soluble in water.

Cellulose chemical derivatization is often accompanied by yellowing and browning of the product during reactions, caused by chromophores formed at elevated temperatures, acidic, basic or oxidative conditions, which are possibly formed from degradation of cellulose and residual hemicelluloses to quinones or conjugated structures. These electron-rich compounds typified by unsaturated aldehydes and ketones can be converted to their non-chromophoric counterparts by strong nucleophiles, such as the hydroperoxide anion formed from hydrogen peroxide.

In an embodiment chemical derivatisation is followed before bleaching, such as bleaching with peroxide or ozone. An advantage of the present bleaching method is avoiding the formation of toxic chlorinated compounds typically formed with chlorine and chlorine dioxide bleaching. Thus washing step can be omitted, which would be difficult in the case of cellulose nanofibers. Further, the present bleaching method is surprisingly suitable for bleaching derivatised fibrillated cellulose, and avoids significant degradation of nanofibres which is typically observed when using chlorine-based bleaching agents.

In an embodiment the process involves a step wherein colour of the derivatised cellulose is monitored and bleaching is carried out in case the colour has a yellow or brown tone.

In an embodiment the derivatisation reaction is sulfation and bleaching is carried out with a mild bleaching reagent, such as hydrogen peroxide or ozone. An advantage of using hydrogen peroxide or ozone is that it is not necessary to wash the bleached sulphated product, because the reaction products are non-toxic. In an embodiment bleaching is carried out after sulfation and before fibrillation. In another embodiment bleaching is carried out after fibrillation. In another embodiment bleaching is carried out after sulfation and fibrillation.

In an embodiment the cellulose microfibrils and/or elementary fibrils are derivatized. In another embodiment the surface of the elementary fibrils of the cellulose is derivatized. In yet another embodiment the degree of derivatization is higher on the cellulose microfibril, and/or on the surface of the elementary fibril, than inside the elementary fibril.

The present method is advantageous in that it selectively derivatizes glucose units that are exposed to the derivatization reagent by the action of the urea and the optionally used swelling agent. This provides the obtained product a chemical structure which differentiates it from derivatized cellulose obtainable using prior methods. Compared to prior cellulose derivatives, the present derivatized cellulose products are thus different in their structure, and also in their properties.

In an embodiment the reaction medium consists of urea and at least one derivatization reagent.

In an embodiment of the present method the chemical derivatisation reaction is carried out on the cellulose pulp in
  a reaction system having water content of 0-20% by weight; or
  a reaction system having water content of 10-20% by weight.

In an embodiment of the present method the reaction system is prepared using cellulose or cellulose pulp, which is not mercerized, or enzymatically or mechanically pretreated.

In an embodiment of the present method the reaction system is prepared using cellulose or cellulose pulp, which has a crystallinity comparable to native cellulose, or to cellulose which is not mechanically or enzymatically pretreated or mercerized.

In an embodiment of the present method the derivatization reagent is a sulfation reagent and the reaction medium, or the reaction system, comprises water 0-10% by weight.

In an embodiment step a. comprises dissolving sulphuric acid in water and at least partially neutralising it with an alkali, followed by adding urea. In an embodiment the alkali is ammonia or NaOH. This has an advantage of preserving the fibrous structure of the product when dispersed in water, making it possible to wash the product with water without organic solvents.

In an embodiment, the sulfation reagent comprises neutralized sulfuric acid as a bisulfate salt of ammonia, alkyl amine, sodium or other alkali salt or mixtures thereof. The neutralization step can also be carried out by mixing sulfuric acid with corresponding sulfate salts. The addition order of any of the components is not particularly limited. Optionally the reagent medium does not contain water.

In an embodiment the sulfonation reagent comprises bisulfate salt and optionally sulphuric acid.

In an embodiment the step c. comprises washing with water, and the washed product is fibrillated.

In an embodiment the method comprises a bleaching step, which is carried out before or after fibrillation.

In an embodiment of the present method the derivatization reagent is a cationization reagent and the reaction medium, or the reaction system, comprises water 10-20% by weight. In a further embodiment the reaction medium or the reaction system comprises alkali, such as NaOH.

In an embodiment, the derivatization reagent is any chemical that can react with cellulose surface.

In an embodiment, more than one derivatization reagent is used optionally with at least one catalyst.

In an embodiment of the present method before or during the step b. water is removed to a moisture content selected from the range 0-20% by weight.

In an embodiment water is removed from the reaction system before the reaction medium is added.

In an embodiment water is removed from the reaction system after the reaction medium is added, and before the derivatization reaction is started.

In an embodiment water is removed from the reaction system before the derivatization reaction is started.

In an embodiment the derivatization reaction is started by raising temperature of the reaction system.

In an embodiment of the present method the reaction system is prepared by impregnating the reaction medium into the cellulose or the cellulose pulp. In another embodiment the cellulose is a cellulose sheet which is impregnated.

In an embodiment of the present method the steps a and b are conducted simultaneously by mixing the components used in step a and in step b.

In an embodiment of the present method at least one of the steps a, b and c are conducted using a continuous process.

In an embodiment the reaction system does not contain an excess of derivatization reagents compared to the anhydroglucose units of cellulose.

In an embodiment of the present method the molar ratio of derivatisation reagent to anhydroglucose unit of the cellulose or the cellulose pulp is between 0.01 to 8, preferably 0.1 to 2, most preferably 0.3 to 1.5.

In an embodiment of the present method the molar ratio of urea to anhydroglucose unit of the cellulose or the cellulose pulp is between 0.01 to 8, preferably 0.1 to 5, most preferably 0.3 to 3.

In an embodiment of the present method the molar ratio of water to anhydroglucose unit of the cellulose or the cellulose pulp is between 0 to 20, preferably 0.1 to 10, most preferably 3-7.

In an embodiment of the present method the reaction system comprises a base-catalyst, and the molar ratio of the base-catalyst to anhydroglucose unit of the cellulose or the cellulose pulp is between 0 to 20, preferably 0.01 to 10, most preferably 0.05-2

In an embodiment the present method further comprises providing in the reaction medium and/or the reaction system at least one swelling agent selected from ionic liquids; salts; deep eutectic solvents; compounds containing carbamide motifs, carbamide peroxide motifs, allantoin motifs, hydratoin motifs, biurets, and combinations thereof.

In an embodiment the chemical modification or derivatization of the cellulose or the cellulose pulp is preferably conducted in presence of at least one swelling agent, which is capable of simultaneously penetrating and/or activating the cellulose fiber. Optionally the swelling agent also acts as a reagent and/or catalyst for derivatization reactions. Preferable swelling agents are ionic liquids; salts, deep eutectic solvents; compounds containing carbamide motifs, carbamide peroxide motifs, allantoin motifs, hydratoin motifs, biruets; chemical structures related to amides, carbamites, pyridine, aromatic amines, alkali metal hydroxides, sulphoxides, sulfone, imidazolium, pyridinium cations; cations paired with $Cl^-$, $CF_3SO_3^-$, $CF_3CO_2^-$, $CH_3CO_2^-$, $HCOO^-$, and $R_2PO_4^-$; cabodiimides, and thiocarbamides; compounds that are capable of disrupting the hydrogen bonds between cellulose polymers, fibrils, and/or fibres; compounds that are attained by complexation of halide salts, acid halides, of quaternary ammonium and/or phosphonium cations along with hydrogen bonding donors such as urea, water, polyols, sugars, oligomeric sugars, glycerol, N-dimethylsulphoxide, N-methylmorpholine N-oxide, and/or ethylene glycol; and combinations and/or complexes of said compounds and/or chemical groups that can be used in combination with a reagent that reacts with the cellulose hydroxyl group. Reagents that react with cellulose hydroxyls preferably contain alkyl halides, carboxylic acids, acids, inorganic acids and their esters, epoxides, lactams, cyclic compounds, cyclic amides, cyclic esters, cyclic ethers, vinylenes, alkenes, alkynes, aromatic compounds, anhydrides, ketones, aldehydes, carbonates, esters, peroxides, imine, imide, cyanates, isocyanates, nitriles, thiols, disulphides, sulphinic acid, sulphonic acid, sulphuric acid, thiocyanates, thione, thials, phophines, phosphonic acid, phosphates, phosphodiester, phosphoric acid, boronic acid, boronic ester, borinic acid, borinic ester; chemical groups that react and/or oxidise cellulose hydroxls; and salts of the aforementioned compounds.

In an embodiment the application of swelling compounds and reagents that react with cellulose hydroxyls is applied at medium or high consistency. For example, a cellulose sheet can be impregnated in an aqueous solution comprising suitable swelling compounds and/or reagents. The cellulose sheet can be shredded, cut, and/or ground into smaller pieces, preferably equal sized strips, either before swelling and/or after. The impregnated cellulose sheets are allowed to react in a suitable condition(s). Before and/or during the reaction, the cellulose fibres become swollen or partially swollen. 'Swollen', in the context of this disclosure means that the swelling compounds propagate throughout the cellulose fibre network, i.e. partially disrupting the hydrogen bonds between cellulose fibrils, fibers, and/or polymers, though preferably leaving the fibrils' structure intact.

In an embodiment the swelling leaves the fibrils' structure intact, i.e. the swelling agent does not disrupt the fibril structure.

In an embodiment the swelling agent comprises urea. In another embodiment, a further swelling agent is used.

In an embodiment the swelling agent to cellulose unit molar ratio is between 0.01 to 8, preferably 0.1 to 5 most preferably 0.3 to 3.

In an embodiment of the present method the derivatisation reaction is carried out until the water retention of the cellulose product increases.

In an embodiment of the present method the derivatisation reaction is not a cellulose carbamate reaction and/or urea is not a reagent or precursor of a reagent.

In an embodiment of the present method the degree of derivatisation is controlled by the amount of reagents and/or reaction parameters.

In an embodiment of the present method the derivatisation reaction is carried out to a degree of derivatisation of 0.05-2.5 mmol/g, preferably 0.1-1.5 mmol/g, most preferably 0.5-1.3 mmol/g.

In an embodiment the cellulose pulp is wood pulp and derivatisation is carried out to DS of at least 0.2, 1.3, 1.4 or 1.7 but not more than 2.5 mmol/g.

In an embodiment of the present method the derivatisation reaction is predominantly carried out heterogeneously on the surface of cellulose or cellulose pulp elementary fibrils.

In an embodiment the present method comprises a further chemical modification step preferably selected from esterification and etherification to increase the degree of derivatization or to introduce additional functionalities.

In an embodiment the present method comprises a further chemical modification step preferably selected from esterification and etherification.

In an embodiment the present method comprises a further chemical modification step preferably selected from cationisation or sulfation.

In an embodiment of the present method the cellulose pulp is extracted from the primary cell wall, the secondary cell wall, or both the primary and the secondary cell wall of cellulose containing raw material.

In an embodiment of the present method the cellulose pulp is hardwood pulp or softwood pulp, dissolving pulp, or cellulose pulp extracted from any suitable plant material including parenchymal cellulose pulp.

In an embodiment the present method further comprises a refining step, or a fibrillation step. to obtain derivatized cellulose nanofibers or derivatized microfibrillated cellulose.

Refining or fibrillation can be done at low (below 5% by weight dry matter content), medium (5-15% by weight dry matter content), or high consistency (more than 15% by weight dry matter content).

In an embodiment the cellulose derivative is refined or fibrillated to comprise cellulose nanofibres preferably having a number average diameter of 2-100 nm, more preferably of 2-10 nm.

An advantage of carrying out refining or fibrillation after derivatisation is that less reagents are needed and gel formation can be avoided. Further, compared to prior art processes that derivatise fibrillated cellulose, the present invention takes cellulose pulp, not cellulose nanofibrils, as starting material, which makes the present process economically more efficient.

In an embodiment the present method further comprises a drying step to obtain a medium consistency product, a high consistency product, or a dry product.

In an embodiment of the present method at least one catalyst is used to conduct the derivatization reaction.

In an embodiment of the present method water is used in the derivatization reaction.

In an embodiment of the present method any organic solvent selected from aliphatic or aromatic alcohols, ethers, chlorinated solvents, hexane, acetone, toluene, pyridine, DMF, DMA, DMSO, ethyl lactate, or a combination thereof, is not used as a solvent or suspending aid in the derivatization reaction. In another embodiment the reaction system or the reaction medium does not contain any of the organic solvents above.

In an embodiment the present method is conducted using a continuous process, semi-continuous process, or batch process.

In an embodiment of the present method no chemical, enzymatic, and/or mechanical pre-treatment(s) for the cellulose, such as cellulose pulp, has been done prior to the derivatisation.

In an embodiment of the first aspect, the water to cellulose unit molar ratio is between 0 to 20, preferably 0.1 to 10, most preferably 3-7

Refined cellulose in the context of this disclosure means cellulose nanofibers obtained using the method described herein and including a refining step or a fibrillation step. The aspect ratio of the nano fibre is typically very high; the length of the nanofibre may be more than one micrometer and the number-average diameter is typically less than 200 nm, such as between 2 and 100 nm. The diameter of nanofibre bundles may be greater, but it is usually less than 1 μm. The smallest nanofibres are similar to the so-called elementary fibrils, the diameter of which is typically 2 to 12 nm. In this context cellulose nanofibers refer also to nanocrystalline cellulose or cellulose nanocrystals, typically having lengths in submicron range, typically below 600 nm and diameters below 50 nm. Refined cellulose may also contain other polysaccharides, such as pectin, the amount of which, for example, depends on the raw material used and the processing method. Refined celluloses can be isolated from the above-described cellulose-containing raw material after the derivatisation method described herein with an apparatus suitable for the purpose, e.g. a grinder, comminutor, rotor-stator mixer or grinders such as Ultra-Turrax, Masuko from Masuko Sangyo, rotor-rotor mixers or grinders such as Atrex-type devices, homogenizer such as Ariete-type or Panda-type from GEA Niro-Soavi, fluidizer, micro- or macrofluidizer such as microfluidizer from Microfluidics and/or ultrasonic disintegrator.

The disclosed cellulose derivatives, derivatized cellulose products, and refined cellulose derivatives, as well as the compositions comprising cellulose derivatives, are able to modify rheological properties of a composition of matter when incorporated or mixed into it. Accordingly, the present cellulose derivative may be used to modify and improve one or more of the properties selected from viscosity, antimicrobial properties, suspension stability, gel insensitivity to temperature, shear reversible gelation, yield stress, and liquid retention of the composition of matter. Compositions of matter whose rheological properties may be modified in this manner include foods, pharmaceuticals, nutraceuticals, personal care products, fibres, papers, paints, coatings, and construction compositions. More specifically, suitable compositions of matter include oral care products; creams or lotions for epidermal application, including moisturizing, night, anti-age, or sunscreen creams or lotions; food spreads, including reduced fat, low fat, or fat free food spreads (for example, mayonnaise); and drilling & fracturing fluids. The modification of rheological properties can be further improved by using the refined cellulose derivative or compositions comprising it.

The disclosed cellulose derivatives and fibrillated cellulose derivatives can change the sizing, strength, scale control, drainage, dewatering, retention, clarification, formation, adsorbency, film formation, membrane formation, and polyelectrolyte complexation of applications. The disclosed cellulose derivatives can also change the stability of an emulsion, dispersion, or foam system. The stability can be further improved by using the refined cellulose derivative or compositions comprising it.

The disclosed chemically modified cellulose may further be used in the manufacture of e.g. paper and paper products, fire retardant materials & products, biomedical products, home & personal care products, water purification products, paint products, construction materials and products, food & feed products in order to improve at least one of sizing, strength, scale control, drainage, dewatering, retention, clarification, formation, absorbency, film formation, membrane formation, and polyelectrolyte complexation during manufacture. Fibrillated cellulose is particularly preferred for use in this method.

In an embodiment the derivatized cellulose product is used as an absorbent or a super absorbent.

The disclosed derivatized cellulose product may be used in the presence of one or more of the following: colloidal silica; colloidal aluminium modified silica; colloidal clay, derivatives of starch containing carboxylic acid functionality, hydroxyl groups, cationic groups, amines and other polar and nonpolar functional groups; derivatives of guar gum containing carboxylic acid functionality, hydroxyl groups, amines and other polar and nonpolar functional groups; natural gums or derivatized natural gums containing carboxylic acid functionality, hydroxyl groups, amines and other polar and nonpolar functional groups; polymers, polyacrylamides, polyacrylates, poly methacrylates and polystyrenics containing carboxylic acid functionality, hydroxyl groups, amines and other polar and nonpolar functional groups; and combinations thereof. Refined celluloses according to the invention is particularly preferred for use in this method. Said chemicals and/or components can be added to the disclosed cellulose composition before or after refining.

In an embodiment the cellulose used in the method is present in a cellulose containing raw material. In another embodiment the raw material's dry matter contains at least 18% cellulose, more preferably at least 50% cellulose, most preferably at least 90% cellulose.

The present derivatized cellulose product can be applied to applications at low, medium, high, or dry consistency. Here, the dry consistency is preferably in a powder, pellet, or granule form. In an embodiment the derivatization reaction is carried out at a temperature selected from −50-300° C.; preferably 30-200° C.; most preferably 50-150° C. In an embodiment the derivatization reaction is started by raising temperature of the reaction system after the desired moisture content of the reaction system is reached by removing water from the reaction system.

In an embodiment a cellulose sheet is used, the reaction system is initially prepared by impregnating the cellulose sheet with the reaction medium, and the impregnated cellulose sheet is first cooled below 20° C. and then heated to 20° C. and/or above. By using this method, an accurate control for reaction kinetics is easier to achieve. In another embodiment the reaction system is initially prepared at a temperature below 20° C., and the heated to 20° C. or above to start the reaction.

In an embodiment suitable reaction conditions are $10^{-3}$ mBar-100 Bar.

In an embodiment a cellulose sheet is used and the impregnated cellulose sheet is dried, i.e. the water is selectively removed.

In an embodiment the derivatization reaction is carried out at a pH value selected between 1-14.

In an embodiment after the reaction the chemically modified cellulose compound is washed with water or suitable solvent and/or solution to flush out unwanted chemicals, side-products, swelling compounds, un-reacted-reagents, free small molecular compounds, free oligomeric compounds, free polymeric compounds, free colloidal compounds.

In an embodiment the derivatisation reaction is sulfation and the derivatised cellulose is washed with water prior to fibrillation. When using partially neutralized sulphuric acid reagents, majority of the cellulose material is still in macroscopic form (>20 μm) after the derivatization reaction, which allows utilization of water as a washing liquid instead of organic solvents, such as alcohols.

In an embodiment at least one solvent is used to concentrate the derivatized cellulose product or the refined derivatized cellulose.

The disclosed method can be done as a batch process, continuous, or semi-continuous; most preferably continuous.

In an embodiment the refined derivatized cellulose product or derivatized cellulose product is further concentrated and subsequently dried. The resulting dried cellulose sample can be re-hydrated by adding water and optional mixing.

In an embodiment, the chemically modified refined or non-refined cellulose is added to suitable applications as a gel-like suspension, paste, granules, pellets, and/or powder.

In an embodiment, the chemically modified refined or non-refined cellulose can be added to suitable applications at a dry matter content of 0.01%-100%.

The refined or non-refined chemically modified cellulose can form gel-like dispersion or suspension, i.e. lose the native fibrous structure. This material containing cellulose, reagents and optionally catalyst, can be wet processed to defined forms, such as pellets, which can thereafter be further processed in e.g. drum drier, float-bed dried, or similar conventional apparatus to reduce the amount of water to a desired level.

In and embodiment the fibre retains its native fibrous structure after the derivatization.

In an embodiment, a derivatized cellulose product is obtained by the method according to the first aspect, wherein the degree of derivatisation is 0.05-2.5 mmol/g, preferably 0.1-1.5 mmol/g, most preferably 0.5-1.3 mmol/g.

EXAMPLES

The following examples are provided to illustrate various aspects of the present invention. They are not intended to limit the invention, which is defined by the accompanying claims Example 1: Characterization of Derivatized Cellulose The DS of cationic samples were determined by conductometric titration of chloride ions with 0.01M $AgNO_3$, typically, 40 g of homogenized 0.5% cationic cellulose suspension was diluted to 250 ml with distilled water. The titration was conducted under constant stirring by the addition of 1-5 ml of 0.01M $AgNO_3$ solution and the conductivity was recorded after 1 minute. The titration was conducted until a conductivity minimum was reached and at least 5 $AgNO_3$ additions were recorded after passing the minimum. The minimum point represents the total amount of chloride ions in the sample, and was calculated from the intersection of ascending and descending conductivity trend lines.

The DS of phosphorylated samples were determined by pH titration using 0.01M HCl, typically, 30-40 g of homogenized 0.5-1% sample suspension was diluted to 150 ml with distilled water. The titration was conducted under constant stirring by the addition of 0.5-1 ml of 0.01M HCl solution and the pH was measured after 0.5-1 minutes. The titration was conducted until a pH of 1-3 was reached. The DS was calculated on the consumption of HCl which was needed to overcome the buffering effect of one of the less basic sodium phosphate group.

Nanofibrillation: The samples were diluted to 0.5% and homogenized (PandaPlus) at 500 Bar four times.

The viscosities of fibrillated samples were measured by Brookfield DV3T viscometer (Brookfield Engineering Laboratories, Middleboro, USA) equipped with a vane geometry (V-72 or V-73). The samples were measured at 0.5 or 1.0 wt-% for 50 and 100 rpm shear rates. All suspensions were diluted to the desired dry matter content by high-shear mixing (17000 rpm, three times 10 seconds with a resting period of 20 seconds between the intervals in a 250 ml beaker) and degassed by vacuum.

Turbidities were measured using a Hach 2100P turbidimeter from 0.5 or 1.0 degassed nanofibrillated derivatized cellulose.

Example 2: Cationization of Dissolving Pulp Cellulose

The cationization was done using a swelling agent combined with cationization reagent. Urea prills (6.0 g) (99%), glycidyl trimetylammonium chloride solution (10.1 g) (73% active epoxy) and water (2.5 g) were weighed and stirred until solution was formed. NaOH (0.5 g) (50 wt-%) was added and 18.8 g of the obtained solution was impregnated in to a sheet of dissolving pulp (10.2 g) (Borregaard Ice-Bear P Aceta) to obtain a reaction composition of cellulose (34.5%), GTMA (25.0%), Urea (20.3%), NaOH (0.9%) and water (19.3%). The swelling/reaction was allowed proceed in a tightly sealed polyethylene bag at 40° C. for 3 days. The derivatized cellulose was finally suspended in distilled water, and washed by repetitive filtration. The sample was then nanofibrillated by high pressure homogenization.

Table 1 presents selected experimental conditions for cationization by this process. Experiments done without urea or with insufficient amount of urea, gave inhomogeneous derivatization and comparatively lower reaction efficiency with a need of higher reagent feed. Another important aspect of this process is the ease of washing of the cationized cellulose, since the fiber morphology is retained even at DS=0.25, making filtration washing possible.

TABLE 1

Conditions for cationization of dissolving pulp. Turbidities and viscosities were determined at 0.5% and V-73 spinneret

| Entry | Temp | Time | Base/ AGU | GTMA/ AGU | UREA/ AGU | H2O/ AGU | DS (titr) | Eff (%) | Pulp yield (%) | Turbidity after homogenization | Brookfield at 50 rpm (cP) | Brookfield at 10 rpm (cP) |
|---|---|---|---|---|---|---|---|---|---|---|---|---|
| CP-69   | 40        | 3 days  | 0.2 | 0.8 | 0   | 16.3 | 0.06 | 8  | 97  | >1000 | 2536 | 8828  |
| CP-65B  | 40        | 3 days  | 0.2 | 0.7 | 0.6 | 4.5  | 0.07 | 11 | 104 | 819   | ND   | ND    |
| CP-68   | 40        | 3 days  | 0.2 | 0.8 | 2.7 | 7.7  | 0.09 | 11 | 95  | 305   | 7693 | 28090 |
| CP-70   | −20 to 40 | 5 days  | 0.2 | 0.7 | 2.6 | 7.2  | 0.1  | 13 | 97  | 54    | 9619 | 35900 |
| CP-67B  | −20 to 40 | 3 days  | 0.1 | 0.4 | 1.4 | 4.0  | 0.09 | 22 | 90  | 325   | ND   | ND    |
| CP-64A  | 40        | 3 days  | 0.1 | 0.4 | 1.4 | 4.2  | 0.08 | 19 | 90  | 327   | 6495 | 24290 |
| CP-64B  | 80        | 5 h     | 0.1 | 0.4 | 1.4 | 4.2  | 0.07 | 17 | 91  | 613   | 4515 | 17660 |
| CP-64C  | 110       | 45 min  | 0.1 | 0.4 | 1.4 | 4.2  | 0.07 | 17 | 87  | —     | —    | —     |
| CP-75   | 40        | 6 days  | 0.2 | 1.1 | 4   | 8.4  | 0.14 | 12 | 93  | 54    | EEE  | 44670 |
| CP-78   | 40        | 6 days  | 0.2 | 1.6 | 4   | 10.5 | 0.16 | 10 | 94  | 47    | 8164 | 30120 |
| CP-74   | 40        | 6 days  | 0.2 | 1.2 | 2.7 | 8.8  | 0.14 | 12 | 92  | 47    | 9940 | 37180 |
| CP-76   | 40        | 6 days  | 0.1 | 1.2 | 2.7 | 8.4  | 0.23 | 20 | 90  | 25    | 8111 | 29960 |
| CP-77   | 40        | 6 days  | 0.1 | 1.6 | 3.7 | 10.0 | 0.25 | 16 | 91  | 8     | 7779 | 28890 |
| CP-82   | 80        | 5 h     | 0.1 | 1.5 | 0   | 9.3  | 0.24 | 16 | 89  | 146   | 8592 | 34720 |
| CP-88   | 80        | 5 h     | 0.1 | 0.8 | 2.7 | 7.4  | 0.11 | 14 | 92  | 204   | 6056 | 23110 |
| CP-89   | 80        | 5 h     | 0.1 | 0.8 | 1.6 | 7.3  | 0.12 | 15 | 92  | 140   | 6720 | 26640 |
| CP-90   | 80        | 5 h     | 0.1 | 0.4 | 1.6 | 10.7 | 0.03 | 9  | 97  | >1000 | 188.7 | 588.3 |
| CP-83   | 40        | 3 days  | 0.1 | 1.5 | 0.0 | 9.3  | 0.25 | 17 | 90  | 13    | 6581 | 25890 |
| CP-84   | 40        | 3 days  | 0.1 | 0.4 | 2.7 | 10.5 | 0.05 | 12 | 97  | >1000 | 390.7 | 1310 |
| CP-85   | 40        | 3 days  | 0.1 | 0.4 | 2.7 | 7.9  | 0.05 | 14 | 94  | >1000 | 1043 | 3719  |
| CP-86   | 40        | 3 days  | 0.1 | 0.8 | 2.7 | 7.3  | 0.15 | 19 | 94  | 32    | 7362 | 28890 |
| CP-91   | 40        | 3 days  | 0.1 | 0.5 | 1.4 | 4.8  | 0.12 | 24 | 96  | 88    | 5853 | 22900 |
| CP-92   | 40        | 3 days  | 0.1 | 1.5 | 0.0 | 5.1  | 0.06 | 4  | 90  | Not homogenized | | |
| CP-93   | 40        | 3 days  | 0.1 | 1.5 | 0.0 | 6.7  | 0.19 | 13 | 88  | >1000 | 1883 | 7330  |
| CP-94   | 40        | 3 days  | 0.1 | 0.8 | 1.6 | 5.0  | 0.18 | 24 | 93  | 14    | 5618 | 24770 |

Example 3: Cationization of Parenchymal Cellulose

The derivatization reaction is done as example 1, replacing dissolving pulp with sugar beet pulp. The derivatization solution is mixed in the pulp by kneading, extruded to pellet form and dried to moisture content of 20-30%. The reaction is then allowed to proceed at 40 C for 3 days to obtain cationic parenchymal cell cellulose.

Example 4: Sulfation of Dissolving Pulp Cellulose

Sulfuric acid (9.0 g) (96%) was carefully dissolved in 5 ml of distilled water. Urea prills (11.0 g) (99%) were added and stirred until a solution was formed. 23 g of the obtained solution was soaked into a sheet of wood pulp (10 g) and allowed to dry at room temperature overnight to obtain a composition of cellulose (34.0%), sulfuric acid (27.6%), urea (35.1%) and water (3.2%). The obtained sheet was heated in a convection oven at 150° C. for 15 minutes. The obtained derivatized cellulose was washed two times with acetone/water 2:1, one time with acetone/water/NaOH pH=12, and again two times with acetone/water 2:1 and finally dispersed in distilled water and fibrillated with high pressure homogenization to obtain a colorless transparent suspension of sulfated cellulose nanocrystals.

Sulfuric acid, when used without urea, resulted in only charred degradation products. The example demonstrates the ability of the urea/sulfuric acid mixture to swell and derivatize cellulose fibers at high consistency.

Example 5: Sulfation of Parenchymal Cellulose

The derivatization reaction is done as example 4, replacing dissolving pulp with sugar beet pulp. The derivatization solution is mixed in the pulp by kneading, extruded to pellet form and dried to moisture content of 3-10%. The reaction is then allowed to proceed at 150° C. for 15 minutes to obtain sulfated parenchymal cell cellulose.

Example 6: Sulfation of Dissolving Pulp Cellulose

Sulfuric acid was diluted with distilled water (sample SUL-1). In separate samples (SUL-2, SUL-3, SUL-4)) dilution was followed by at least partial neutralization with NaOH or ammonia solutions. Urea prills were added and stirred until a solution was formed. The obtained solution was soaked into a sheet of wood pulp and allowed to dry at room temperature until moisture content was below 2 wt-%, to obtain the reagent ratios listed in Table 2. The material was then heated in a convection oven at the desired temperature and time to obtain cellulose sulfate (Scheme 1). The obtained derivatized cellulose was washed three times with ethanol/water 2:1, and finally dispersed in distilled water and fibrillated with high pressure homogenization.

The degree of derivatization of the sulfated samples was determined gravimetrically by hydrolysis of sulfates in HCl solution. Briefly, one gram of 30-35 wt-% sulfated pulp was precisely weighed in 50 ml falcon tube and 30 ml of 12 % HCl solution was added and tightly capped. The sample was vigorously shaken to disperse the pulp and then allowed to hydrolyze for 4 days at room temperature. The sample was then centrifuged at 4500 rpm for 10 minutes and the separated water was collected and transferred to a weighed 50 ml falcon tube. 1.0 g of barium hydroxide octahydrate was then added and vigorously stirred for 5 minutes and allowed to stand for 2 hours. The precipitate was collected by centrifugation at 4500 rpm for 10 minutes and the water discarded.

The precipitate was washed once with distilled water/centrifugation and finally dried overnight at 105° C. The amount of sulfate was calculated from the weight of precipitated barium sulfate.

Scheme 1. Chemical struture of produced cellulose sulfate.

R = H or $SO_3X$
X = H, Na, or $NH_4$

Figure 1:
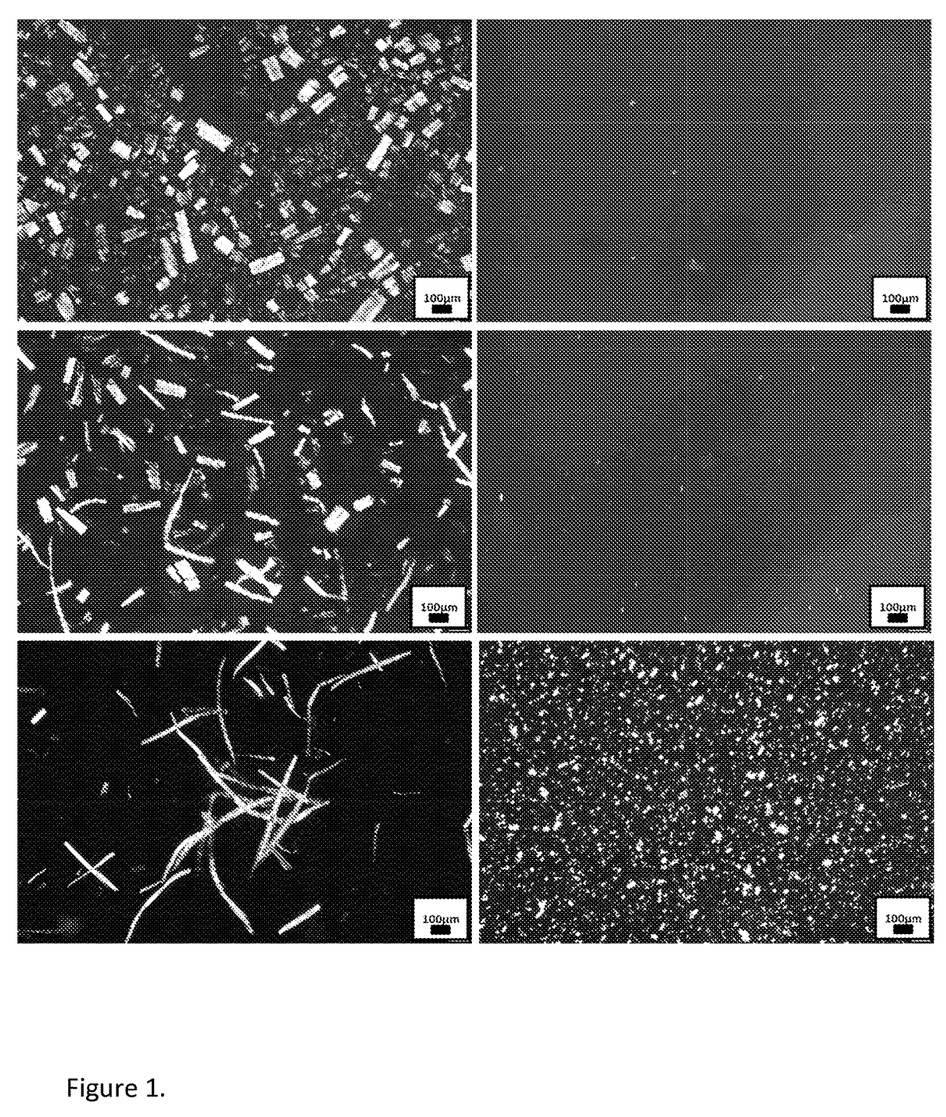
FIG. 1. Optical microscopy images between crossed polarizers of cellulose sulfate before (Left) and after homogenization (Right). Samples from top to bottom: Table 2, entries SUL-1, SUL-2 and SUL-4. Scale-bar 100 μm.
Figure 2:
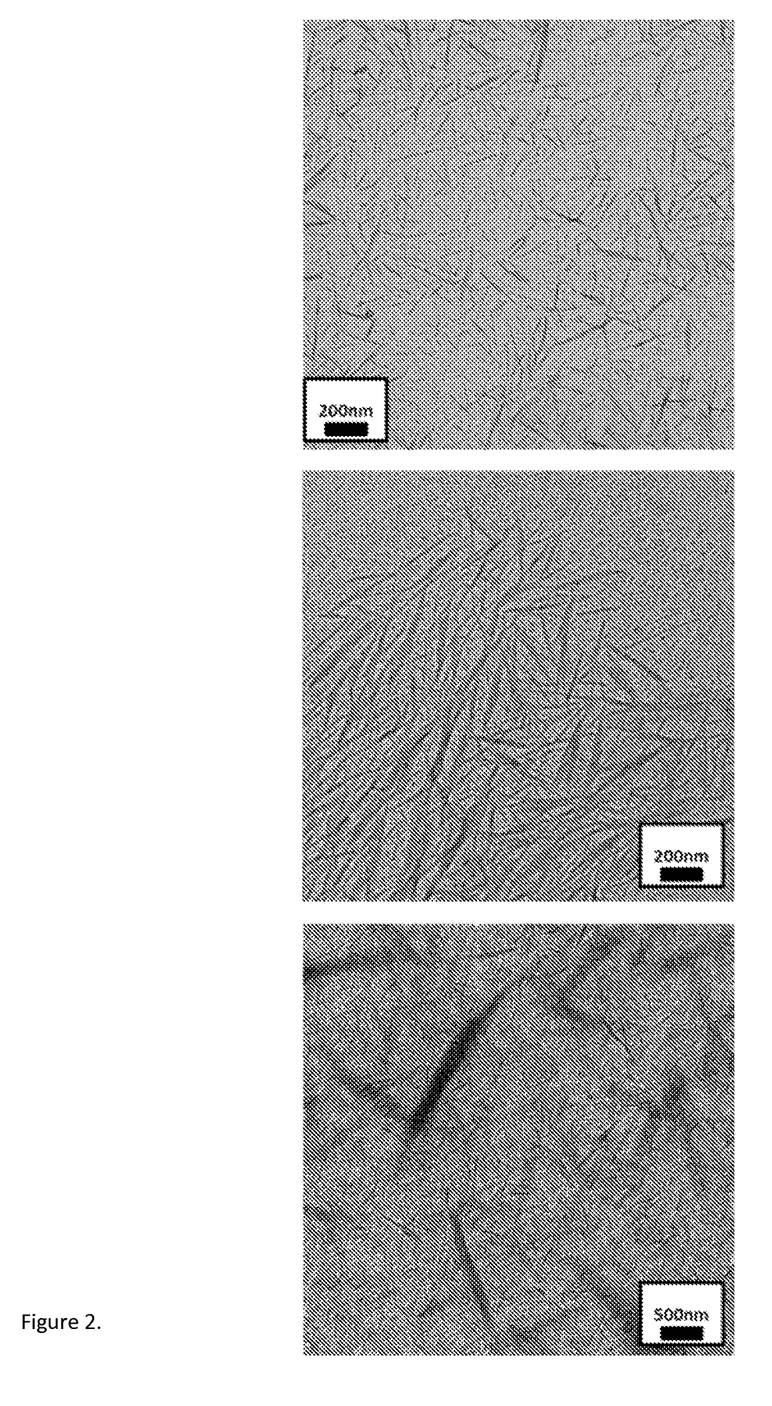
FIG. 2. Transmission electron microscopy images of homogenized sulfated cellulose. From top to bottom Table 2 Entries SUL-1, SUL-2 and SUL-4.

Reactions made with reagent molar ratio Urea/$H_2SO_4$/AGU 2:1:1 (Table 1, Entry SUL-1), produced cellulose sulfate that swelled in water to gel-like state. Optical microscopy image (FIG. 1) of this sample in water before homogenization reveal swollen fragmented fibers accompanied with a considerable amount of disintegrated structures of less than 20 μm in size. After homogenization, entities visible only with electron microscopy are obtained, having thicknesses ranging from 5 to 50 nm and lengths 50 to 500 nm (FIG. 2). This material had also low viscosity and turbidity (Table 2) when dispersed in water.

Figure 3:
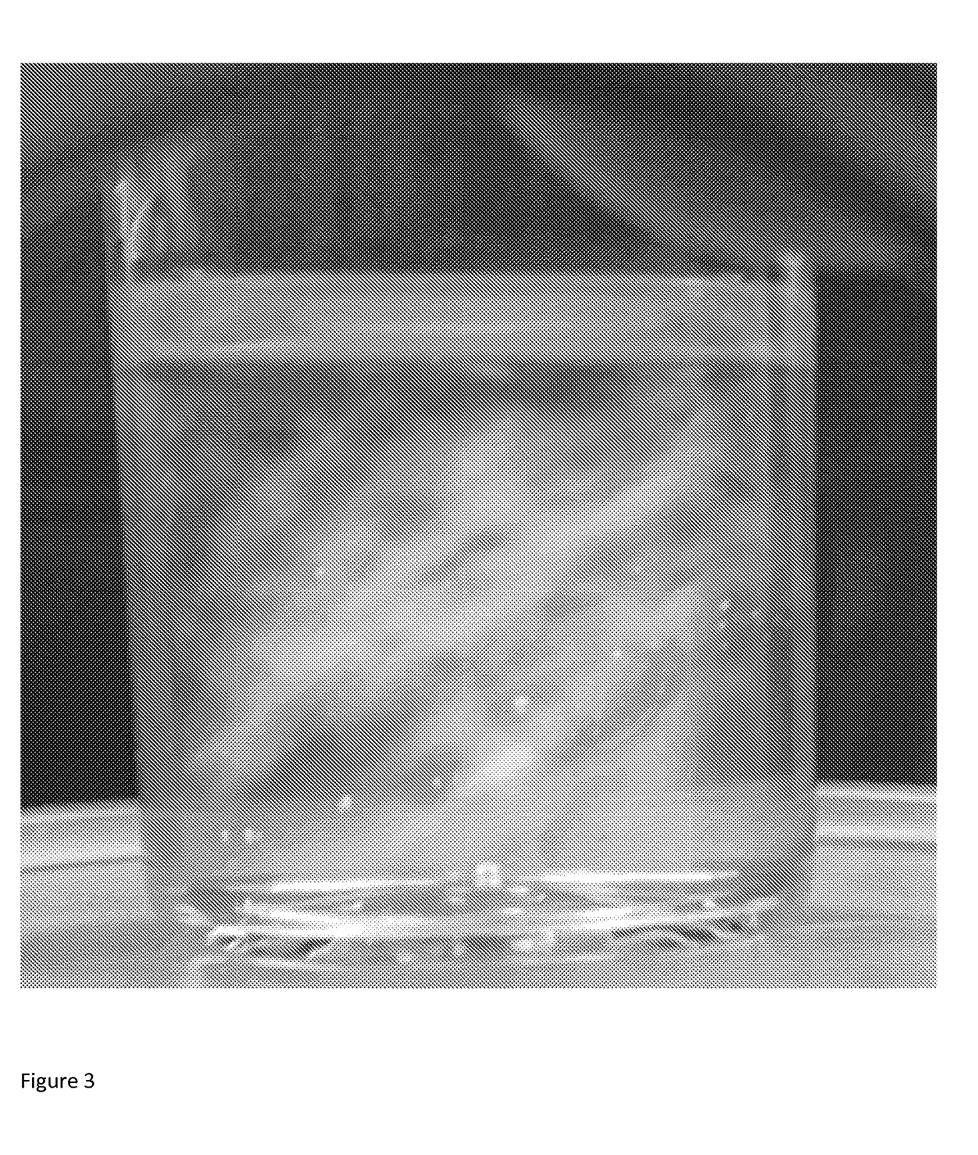
FIG. 3. Photograph of homogenized sulfated wood pulp in glass vial (sample Table 1, Entry SUL-2) at 0.5 wt-%, showing birefringence when observed through a polarizing lens against the polarized light of an LCD-display.

It was noted that partial neutralization of sulfuric acid with NaOH or ammonia (Table 1, entries SUL-2, SUL-3 and SUL-4) preserved the fibrous structure of cellulose pulp when dispersed in water after the reaction, and thus the washing step could be done with water by filtration instead of using organic solvent. In addition, lowering the $H_2SO_4$/anhydroglucose (AGU) molar ratio had an influence on the size of formed cellulose entities after homogenization. FIG. 1 shows optical microscopy images of samples before and after homogenization. Before mechanical treatment, the sulfated cellulose (Table 1, entry SUL-2) with NaOH/Urea/$H_2SO_4$/AGU 1:1:1:1 has a swollen fibrous appearance with average lengths exceeding 20 μm, however after homogenization the entities are visible only in electron microscopy with thicknesses and lengths in the range of 5-50 nm and 50-500 nm respectively. In addition chiral nematic structures can be observed in crossed polarizers (FIG. 3). At $H_2SO_4$/AGU=0.5 (Table 2, entry SUL-4), particles in the range of 5 nm to 100 μm (FIG. 1 and FIG. 2) can be observed. Properties of these homogenized materials are listed in Table 3.

TABLE 3

Brookfield viscosities and turbidities of homogenized cellulose sulfate suspensions measured at different concentrations.

| Sample | Measurement concentration (wt-%) | Brookfield viscosity at 50 RPM (cP) | Turbidity (NTU) |
|---|---|---|---|
| SUL-1 | 1 | Fluid | 19 |
| SUL-2 | 1 | 700 | 81 |
| SUL-2 | 2 | 6500 | 148 |
| SUL-4 | 2 | 1700 | >1000 |

The example demonstrates the controllability of viscosity and particle dimensions of homogenized cellulose sulfate by adjusting the degree of sulfuric acid neutralization and reagent/AGU ratio. The reaction can be conducted at various temperatures and times giving high cellulose yield and degree of derivatization, with simple reaction process equipment setup and reagents of low cost. Further, the example demonstrates that bisulfates, such as sodium or ammonium bisulfate can be used as reagent, reducing the urea feed and ammonia waste. Partial neutralization also preserves the fibrous structure of the cellulose pulp, thus organic solvents can be avoided in the washing steps.

Example 7: Bleaching of Cellulose Derivatives

Bleaching experiments were done by adding NaOH-solution to the cellulose derivative water suspensions and mixed by kneading to adjust the pH to 10-11. Concentrated $H_2O_2$ was the added and then mixed to the suspension. The samples were then allowed to react at room temperature for 24 h or at 80° C. for 1 hour. Both homogenized and non-homogenized cellulose sulfate samples, produced by the methods described in previous examples, were tested.

Figure 4:
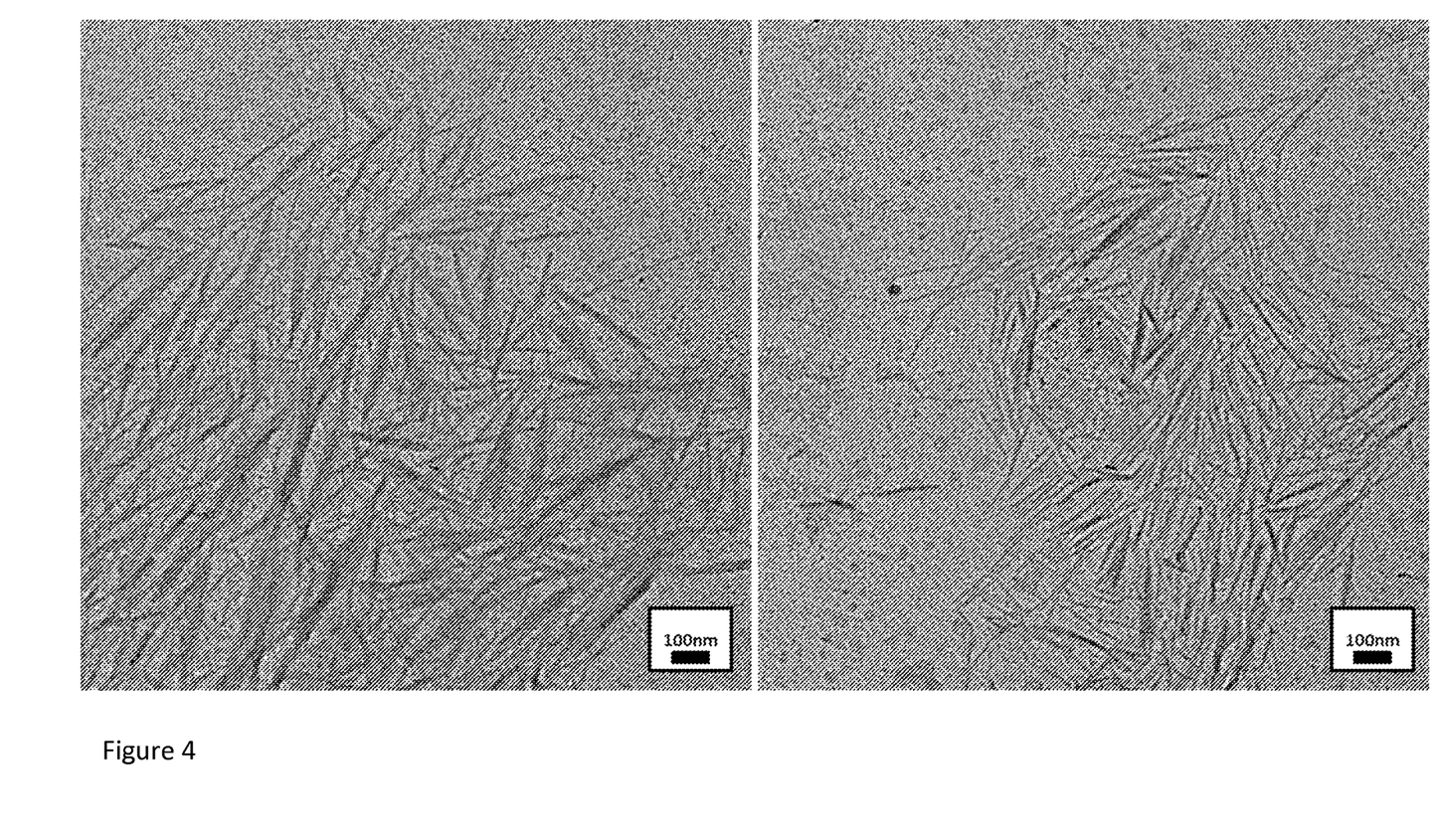
FIG. 4. Transmission electron microscopy images of homogenized sulfated sample before and after bleaching (Table 1, Entry 7).

Table 4 presents selected examples of bleaching experiments and conditions. $H_2O_2$ bleaching is effective for both non-homogenized and homogenized samples, although the fibrillated sample appears to bleach more efficiently at lower peroxide loading compared to non-fibrillated. It was also noted that peroxide treatment could be used to simultaneously bleach and reduce viscosity of fibrillated samples. No notable changes can be seen with transmission electron microscopy (FIG. 4) of homogenized cellulose sulfate samples before or after bleaching.

TABLE 2

Reaction conditions and reagent molar ratios for wood pulp sulfation

| Entry | Cellulose pulp | React. Temp. (° C.) | React. time (min) | Urea/ $H_2SO_4$ (mol/mol) | NaOH/ $H_2SO_4$ (mol/mol) | $NH_3$/ $H_2SO_4$ (mol/mol) | $H_2SO_4$/ AGU (mol/mol) | Product Yield | Degree of derivatization (mmol/g) |
|---|---|---|---|---|---|---|---|---|---|
| SUL-1 | Dissolving | 150 | 15 | 2.1 | — | — | 1.0 | 134% | 1.7 |
| SUL-2 | paper grade | 110 | 1000 | 1.0 | 1.0 | — | 1.0 | 122% | 1.4 |
| SUL-3 | paper grade | 160 | 15 | 1.0 | — | 1.0 | 1.0 | 129% | 1.3 |
| SUL-4 | paper grade | 110 | 1000 | 1.0 | 1.0 | — | 0.5 | 96% | 0.2 |

TABLE 4

Conditions for bleaching of non-homogenized and homogenized cellulose sulfate samples.

| Entry | Type of cellulose sulfate | Cellulose (%) | $H_2O_2$ (%) | NaOH (%) | Temp. (° C.) | Time (h) | Effect |
|---|---|---|---|---|---|---|---|
| 1 | non-homogenized | 6 | 0.3 | 0.03 | 22 | 24 | Orange |
| 2 | non-homogenized | 6 | 0.5 | 0.03 | 22 | 24 | Light yellow |
| 3 | non-homogenized | 6 | 1.0 | 0.03 | 22 | 24 | Light yellow |
| 4 | homogenized | 4.5 | 0.2 | 0.03 | 22 | 24 | Yellow |
| 5 | homogenized | 4.5 | 0.4 | 0.03 | 22 | 24 | Light Yellow |
| 6 | homogenized | 4.5 | 0.55 | 0.03 | 22 | 24 | Slightly Yellow |
| 7 | homogenized | 4.5 | 0.74 | 0.03 | 22 | 24 | Colorless |
| 8 | homogenized | 4.5 | 0.30 | 0.03 | 80 | 1 | Light Yellow |
| 9 | homogenized | 4.5 | 0.50 | 0.03 | 80 | 1 | Slightly Yellow |
| 10 | homogenized | 4.5 | 0.78 | 0.03 | 80 | 1 | Colorless |

The example demonstrates that hydrogen peroxide can effectively bleach cellulose sulfate and can be applied before or after nanofibrillation. If desired, no additional washing steps are necessary after bleaching. Further, the viscosity of the nanofibrillated derivative could be reduced by the peroxide treatment.

Different non-binding example aspects and embodiments of the present invention have been illustrated in the foregoing. The above embodiments are used merely to explain selected aspects or steps that may be utilized in implementations of the present invention. Some embodiments may be presented only with a reference to a certain aspect of the invention. It should be appreciated that the embodiments may apply to other aspects as well. Any appropriate combination of the embodiments and the aspects may be formed.

The invention claimed is:

1. A method for derivatizing cellulose pulp selected from hardwood pulp, softwood pulp, and dissolving pulp, the method comprising:
   a. preparing a reaction medium comprising urea and at least one derivatization reagent;
   b. carrying out a heterogenous chemical derivatisation reaction between the at least one derivatization reagent and the cellulose pulp in a reaction system comprising the cellulose pulp in contact with the reaction medium, and having a water content of 0-20% by weight, to provide a derivatized cellulose product; and
   c. fibrillating to obtain derivatized cellulose nanofibers or derivatized microfibrillated cellulose;
   wherein the derivatization reagent is a cationization reagent and the reaction medium comprises water 10-20% by weight.

2. The method according to claim 1, wherein the chemical derivatization reaction is carried out on the cellulose pulp in a reaction system having water content of 10-20% by weight.

3. The method according to claim 1, wherein the reaction system is prepared using cellulose pulp, which is not mercerized, or enzymatically or mechanically pre-treated.

4. The method according to claim 1, wherein before or during the step b. water is removed to a moisture content selected from the range 0-20% by weight.

5. The method according to claim 1, wherein the reaction system is prepared by impregnating the reaction medium into the cellulose pulp.

6. The method according to claim 1, wherein at least one of the steps a, b and c are conducted using a continuous process.

7. The method according to claim 1, wherein the molar ratio of the derivatization reagent to anhydroglucose unit of the cellulose pulp is between 0.01 to 8.

8. The method according to claim 1, wherein the molar ratio of urea to anhydroglucose unit of the cellulose pulp is between 0.01 to 8.

9. The method according to claim 1, wherein a molar ratio of water to anhydroglucose unit of the cellulose pulp is between 0.05 to 20.

10. The method according to claim 1, wherein the reaction system comprises a base-catalyst, and the molar ratio of the base-catalyst to anhydroglucose unit of the cellulose pulp is between 0 to 20.

11. The method according to claim 1, comprising further providing in the reaction system at least one swelling agent selected from ionic liquids; salts; deep eutectic solvents; compounds containing carbamide motifs, carbamide peroxide motifs, allantoin motifs, hydratoin motifs, biurets, and combinations thereof.

12. The method according to claim 1, wherein a degree of derivatization is controlled by amounts of reagents and/or reaction parameters.

13. The method according to claim 1, wherein the derivatization reaction is carried out to a degree of derivatization of 0.05-2.5 mmol/g.

14. The method according to claim 1, wherein the derivatization reaction is predominantly carried out heterogeneously on the surface of cellulose pulp elementary fibrils.

15. The method according to claim 1, comprising a further chemical modification step selected from esterification or etherification to increase a degree of derivatization or to introduce additional functionalities.

16. The method according to claim 1, comprising a further chemical modification step selected from cationization or sulfation.

17. The method according to claim 1, further comprising a refining step to obtain derivatized cellulose nanofibers or derivatized microfibrillated cellulose.

18. The method according to claim 1, further comprising a drying step to obtain a medium consistency product having a dry matter content of 5-15 by weight, a high consistency product having a dry matter content of more than 15% by weight, or a dry product.

19. The method according to claim 1, further comprising washing with water before step c.

* * * * *